United States Patent
Honan, III

(10) Patent No.: US 7,224,264 B2
(45) Date of Patent: May 29, 2007

(54) RADAR HITCH

(76) Inventor: James W. Honan, III, 6613 Tennis Dr., Stedman, NC (US) 28391

( * ) Notice: Subject to any disclaimer, the term of this patent is extended or adjusted under 35 U.S.C. 154(b) by 122 days.

(21) Appl. No.: 10/997,653

(22) Filed: Nov. 24, 2004

(65) Prior Publication Data

US 2005/0151631 A1    Jul. 14, 2005

Related U.S. Application Data

(60) Provisional application No. 60/524,304, filed on Nov. 24, 2003.

(51) Int. Cl.
*G08B 21/00* (2006.01)
(52) U.S. Cl. ............... 340/431; 340/686.2; 340/686.4
(58) Field of Classification Search ............... 340/431, 340/686.2, 686.4
See application file for complete search history.

(56) References Cited

U.S. PATENT DOCUMENTS

| | | | | |
|---|---|---|---|---|
| 5,108,123 A | * | 4/1992 | Rubenzik | ............... 280/477 |
| 5,821,852 A | * | 10/1998 | Fairchild | ............... 340/431 |
| 5,861,814 A | * | 1/1999 | Clayton | ............... 340/687 |
| 6,592,230 B2 | * | 7/2003 | Dupay | ............... 359/839 |

* cited by examiner

*Primary Examiner*—Jeffery Hofsass
*Assistant Examiner*—Hongmin Fan
(74) *Attorney, Agent, or Firm*—Jeffrey K. Seto

(57) ABSTRACT

A two part guidance system that can be added to any vehicle with a traditional ball hitch that provides guidance to the driver during the hitching process. A sensor plate holds multiple sensors in an orientation that surrounds the ball and the sensors provide position information regarding the trailer's tongue to the driver via a display box in the cab of the vehicle. The display box preferably includes selectively illuminated arrows that indicate to the driver which direction to go in order to align the ball directly underneath of the tongue. Detection signals are sent to the display box through a cable or wirelessly. The display box can receive electrical power from the vehicle's electrical system or from batteries.

14 Claims, 6 Drawing Sheets

RADAR HITCH

BACKGROUND OF THE INVENTION

The present invention was originally disclosed in U.S. provisional patent application Ser. No. 60/524,304 filed on Nov. 24, 2003, and priority is claimed to the provisional patent application.

The present invention relates generally to the field of trailer hitches and more specifically to an electronic system for aligning the two parts of a trailer hitch.

A traditional trailer hitch comprises a socket, or tongue, located at the front of a trailer and a ball, which fits into the socket, located on the back of a towing vehicle. The ball can be secured to the rear bumper of the vehicle or the ball can be on a tow bar that is secured to the rear of the towing vehicle. When the two parts of the hitch are joined and locked in place, the ball cannot be removed from the tongue but the ball can rotate within the socket allowing the trailer to be pulled, and even pushed, in multiple directions. A problem with traditional trailer hitches is that the driver of the towing vehicle cannot see the ball or socket when he is trying to engage the two parts of the hitch. Coupling the ball and socket requires the driver to maneuver his vehicle rearward so that the ball is positioned underneath of the tongue of the trailer. Understandably, without being able to see either part of the hitch, traditional coupling requires multiple trial and error attempts. Even with assistance from a second person, the coupling process can be frustrating. Adding pressure to the whole situation is the fact that if the driver backs up too far, the trailer's tongue will hit and damage the back of the vehicle.

Electronic sensors are devices that respond to a given stimulus. Motion detectors are well known and traditionally used in the security field to sound an alarm when intruders are present. Motion detectors can be designed to respond to movement by causing a light to light up or by causing a noise to be created. Some detectors work in pairs, wherein a solid beam of light is maintained between a pair of sensors and the sensor is triggered by breaking the beam of light. Other sensors work independently, wherein each sensor sends out one or more signals, with no expectation of receiving a reflection of the signal(s), and the sensor is triggered when it does receive a reflected signal. Photoelectric sensors are electronic sensors that use changes in received light to detect the presence of an object. Diffuse reflection photoelectric sensors, which can be very small in size, can detect the presence of an object up to 23 inches away. Motion detectors and photoelectric sensors can be set to different sensitivities by raising or lowering the received signal threshold of each sensor, to a higher or lower threshold. A low threshold allows detection of far away movement/objects and a high threshold requires close movement/proximity for triggering the sensor.

Wireless communications are traditionally accomplished by embedding information on a carrier wave. Radio waves are most commonly used as the carrier waves. In simple applications, such as having a sensor indicate that some object has been detected, little or no information needs to be embedded in the carrier wave. By simply sending a radio signal upon detection of the object and not sending a signal otherwise, such systems can be produced with small amounts of logic and circuitry. Radio transmitters and receivers are well known and are currently available in sizes small enough to be used with the present invention.

What is needed in the field is an electronic device that can be added to any towing vehicle that provides directions to the driver of the vehicle during the coupling process. The ideal device would use multiple sensors positioned around the ball to detect the position of the trailer tongue. The sensors would provide positioning information to the driver that enables the driver to align the ball with the tongue. The sensors would be electrically connected to a display located inside the vehicle. The display box would preferably be positioned so that the driver can see and hear information from the box while the driver is seated in the driver's seat. The display would provide easy to understand left, right, backwards and stop signals to the driver. Electrical power could be supplied to the present device either directly from the vehicle's electrical system or from batteries. Communications between the sensors and the display box can be wireless or wired.

SUMMARY OF THE INVENTION

A guidance system that is adapted to be attached to a towing vehicle, wherein the guidance system provides visual and auditory signals to the driver of the vehicle, which aids the driver in hitching a trailer to a ball hitch on the rear of the vehicle. A sensor plate with a hole in the middle is secured underneath of the ball by removing the ball from the vehicle, passing the stem of the ball hitch through the hole in the sensor plate, and replacing the ball hitch in its original place on the vehicle. The sensor plate houses multiple sensors around the circumference of the plate with each sensor capable of detecting when an object is above it and subsequently sending a detection signal. Each sensor is electrically connected to a sensor plate cable, in the preferred embodiment, that provides power to the sensors and receives detection signals from the sensors. A display box that is adapted to be at least temporarily mounted within the cab of the vehicle receives the detection signals. The display box has on its front multiple lights and a speaker. The multiple lights include at least one light each for indicating to the driver that he should move the ball forward, backwards, left and right. The display box is adapted to be electrically connected to a power source in the vehicle or it can be battery powered. When the trailer's tongue passes within a selected distance over any sensor in the sensor plate, that sensor sends a detection signal to the display box. The display box receives all of the detection signals and causes one or more of the lights to illuminate, wherein the illuminated lights provide guidance to the driver for properly aligning the ball directly underneath of the tongue.

The multiple lights on the display box preferably include a left arrow, a right arrow, a backwards arrow, and a forward arrow for indicating which direction the driver should move. The multiple lights on the display box may also include a large central light that lights up when the ball is properly aligned with the tongue, indicating that the driver should stop. The display box may also include four smaller lights dispersed on top of, below of, to the left of, and to the right of the large central light, for indicating progress to the driver. The speaker in the display box preferably provides beeps when the tongue has been detected by any of the sensors and a solid tone when the ball is properly aligned for hitching with the tongue.

It is an object of the present invention to aid drivers that must hitch a trailer to their vehicle.

It is another object to provide a guidance system that can be added to any vehicle with a traditional ball hitch and thereafter aid the driver in hitching the vehicle to any trailer.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
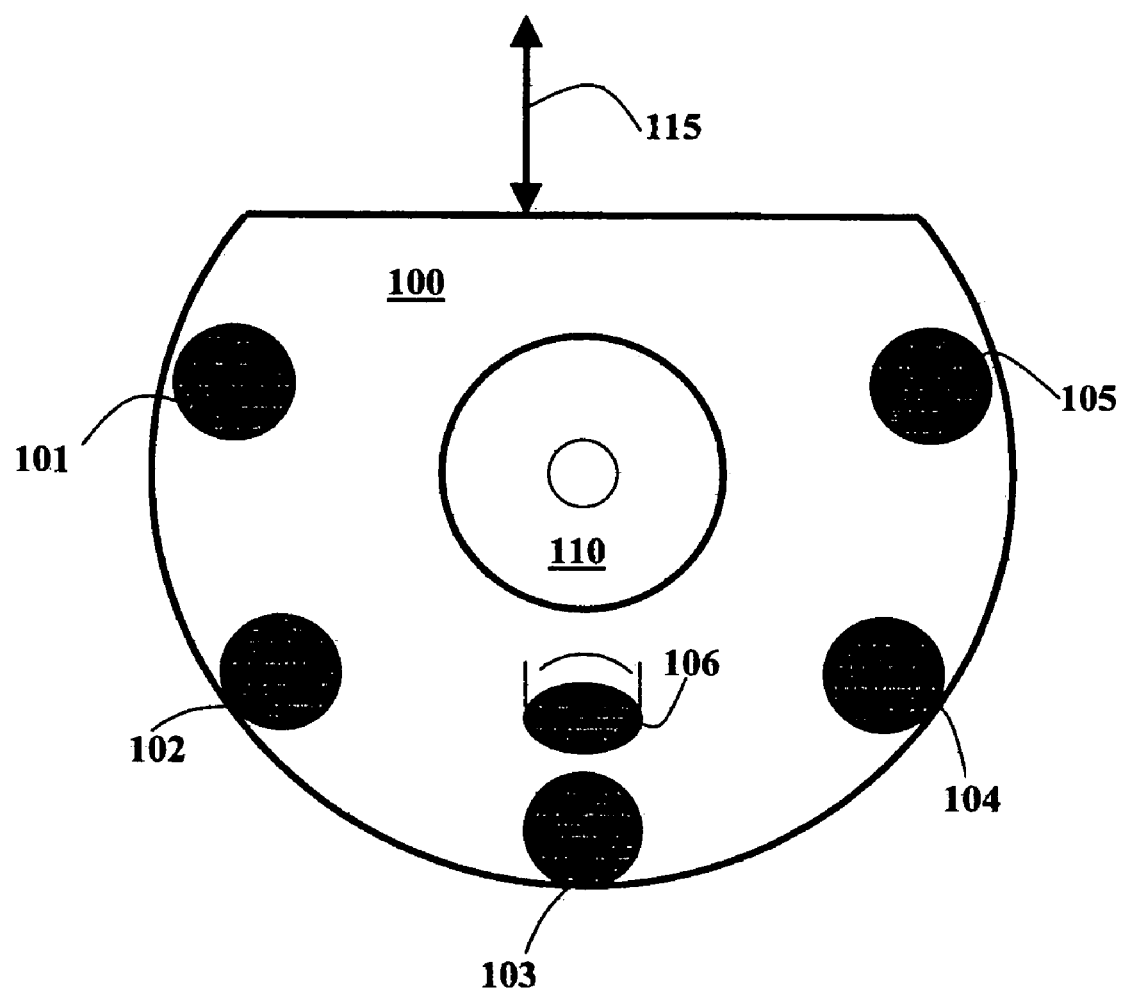
FIG. 1 is a top view of the sensor plate in the preferred embodiment.

The present invention is designed to be attached to any towing vehicle with a traditional ball hitch attached to the rear of the vehicle. No special ball is needed and no addition or alteration to the tongue of the trailer is needed for this invention to be used. The preferred embodiment of the present sensor plate 100 is shown in FIG. 1. Sensor plate 100 includes six sensors 101–106, which are C18D-AP-1A photoelectric sensors offered by AutomationDirect.com in the preferred embodiment. The sensor plate 100 is generally circular in shape with one flat side that is designed to face the towing vehicle. The shape of the sensor plate 100 shown in FIG. 1 is designed to allow attachment to towing vehicles that do not have much room between the ball and the bumper, or other rear portion, of the towing vehicle. The sensor plate can be provided in other shapes besides circular, as will be discussed in conjunction with FIG. 4, below. Five of the sensors 101–105 are arranged around the periphery of the plate 100 in an extended semi-circle, with each of the five sensors 101–105 facing upward. Each sensor 101–105 acts like a small radar unit by detecting when an object is directly above any of the sensors 101–105. The area of interest in this case is small, approximately one foot above the sensor plate 100. The sixth sensor 106 is angled rearwardly at approximately 45° so that it faces toward the trailer to be hitched. The sixth sensor 106 allows the present system to detect the tongue of the trailer when it is approximately two feet from the ball 110. Once the trailer's tongue has been spotted by sensor 106 a light on a display box in the cab of the vehicle is illuminated indicating to the driver that the tongue is approximately two feet from the ball and he should continue backing up. The entire radar hitch system is designed to be powered by the 12-volt electrical system of the towing vehicle. In alternate embodiments, other types of sensors including motion detectors can be used and batteries can be used to provide electrical power to the system.

The present radar hitch system allows a driver to attach a trailer to the back of a vehicle without the need of a second person providing directions to the driver. The system uses the multiple sensors 101–106 to detect the position of the trailer tongue. The sensors provide positioning information to the driver that enables the driver to align the ball 110 with the tongue of the trailer. The sensors 101–106 are electrically connected to a display box (see FIG. 2) that is located inside the vehicle. When a sensor detects an object above it, or in front of it in the case of sensor 106, the sensor causes one or more associated lights on the display box to light up. Electrical power is delivered to the sensor plate 100, and tongue position information is sent to the display box, via cable 115, which includes a quick-connect coupler in the preferred embodiment.

Figure 2:
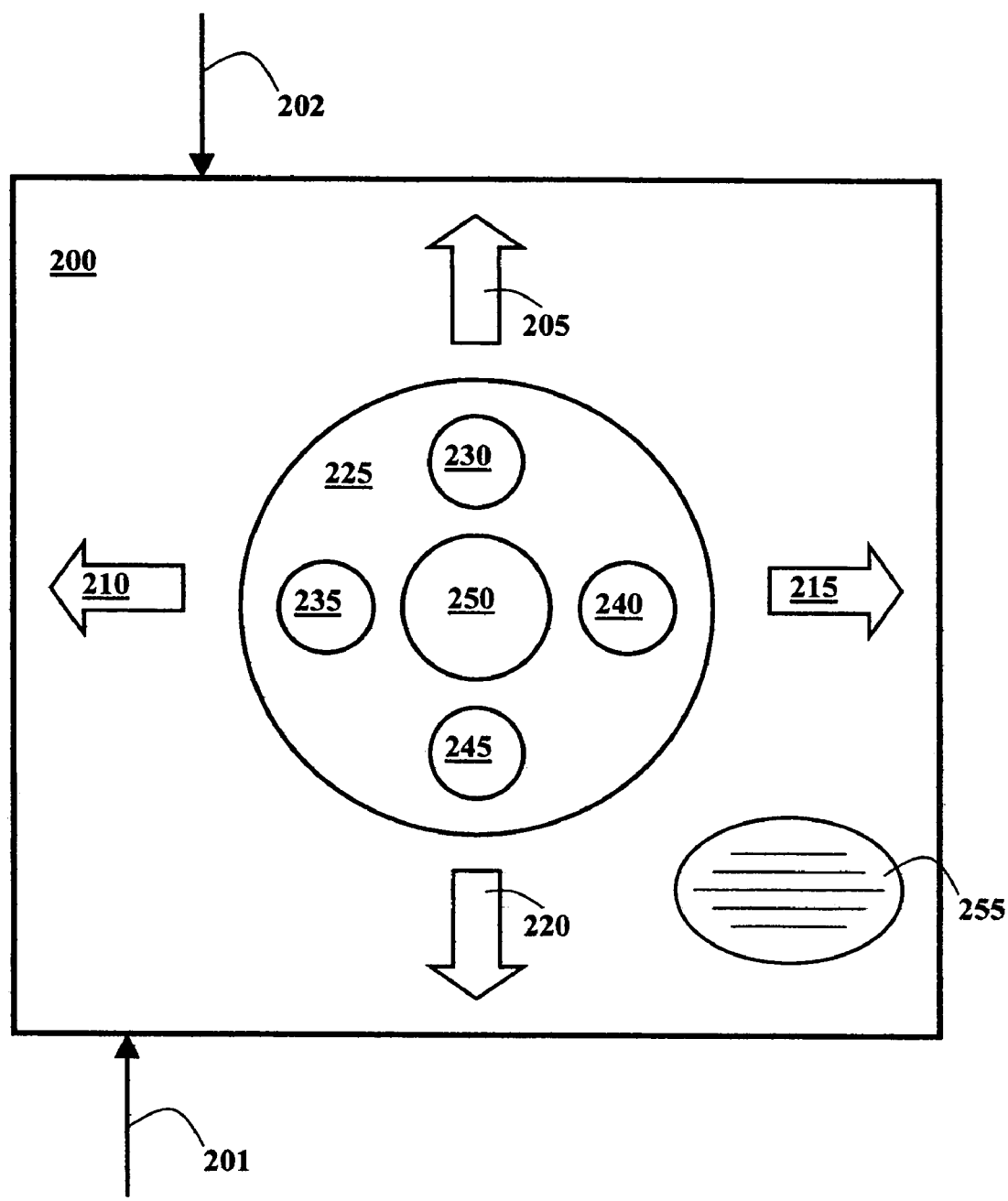
FIG. 2 is a frontal view of the display in the preferred embodiment.

FIG. 2 shows an exemplary display box 200 of the present radar hitch system that receives trailer tongue position information from the sensors via cable 201. The display box 200 receives electrical power from a power cord 202. Of course, if batteries are used to power the display box 200 then power cord 202 is unnecessary. The display box 200 is positioned within the cab of the towing vehicle so that the driver can see and hear information from the box 200 while the driver is seated in the driver's seat of the vehicle. The display box 200 provides easy to understand guidance signals, such as arrow lights 205, 210, 215 and 220, circular lights 230, 235, 240, 245 and 250, and beeps and/or solid tones from speaker 255 that aid the driver in hitching the trailer to the vehicle. In an alternate embodiment, the speaker is used to provide verbal directions, including "back up slowly", "go right", "go left" and "stop", to the driver. Working in conjunction with the sensors, the display box 200 indicates to the driver when the ball hitch needs to be moved left, right, backwards, and when the driver should stop. For purposes of this description, left and right directions are provided from the perspective of the driver of the vehicle while facing forward in the driver's seat. In the preferred embodiment, if the sensor plate detects the trailer's tongue to the left of the ball, then the left arrow 210 is illuminated indicating to the driver that he must maneuver the ball to the left. As the tongue is brought closer to the ball, circular light 235 is illuminated indicating to the driver that he is making progress. Similarly, if the sensor plate detects the trailer's tongue to the right of the ball, then the right arrow 215 is illuminated indicating to the driver that he must maneuver the ball to the right for proper alignment. As the tongue is brought closer to the ball, circular light 240 is illuminated indicating to the driver that he is making progress. When the tongue is directly over the ball and trailer's tongue is ready to be lowered onto the ball, all lights on the display box 200 are turned off except for the large central light 250. Central light 250 is preferably red in color and the largest light on the display box 200. When this large, red light comes on, it indicates to the driver that he can stop the vehicle because the ball is in the home position and the tongue is ready to be lowered onto the ball. The home position being defined as when the tongue is directly over the ball and hitching of the two parts is possible. The smaller circular lights 230, 235, 240 and 245 can be any color but are preferably yellow or orange. The arrow lights 205, 210, 215 and 220 may also be any color but are preferably green. This color scheme follows that of a traditional stoplight, wherein green indicates go, yellow indicates slow down, and red indicates stop. Electrical power can be supplied to the display box 200 via power cord 202 either directly from the fuse box of the vehicle or via a cigarette lighter adapter.

Figure 3:
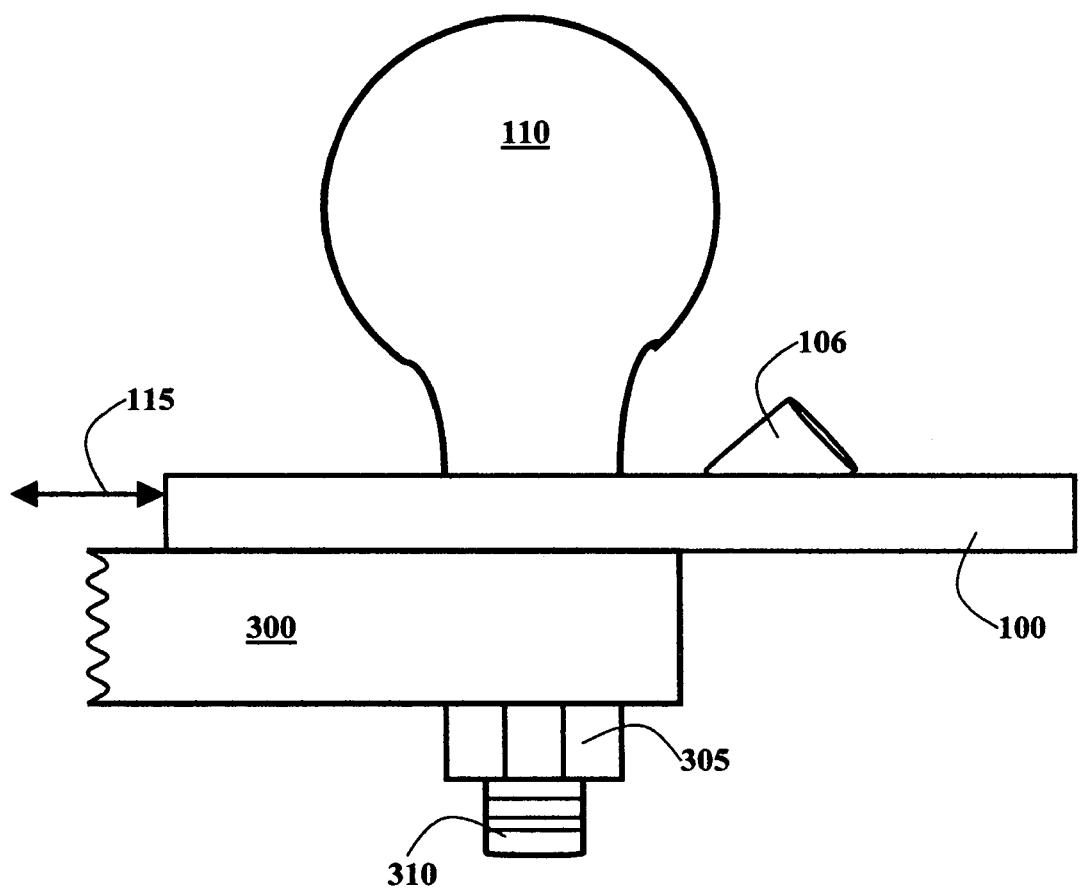
FIG. 3 is a side view of the sensor plate in its operational position.

FIG. 3 is a side view of the preferred embodiment of the sensor plate 100 in its operational position. The sensors of the present device are preferably housed within a thin metal plate, however other materials including plastics could be used in other embodiments. The metal sensor plate 100 is held in place by removing the ball 110 from the bumper 300 or tow bar of the vehicle and placing stem 310, or ball support arm, of the ball through a hole that is provided near the center of the sensor plate 100. The ball is then replaced in its original position on the vehicle thereby securing the sensor plate 100 in its operational position with the use of nut 305. The electrical connections 115 to and from the sensor plate preferably include a quick-connect coupler for easy connection and disconnection. Quick-connect couplers are well known in the trailer industry. In an alternative embodiment, the sensor plate includes at least one battery and a wireless connection is used between the sensors and the display box. Applicant knows of no other device that provides a hitching guidance system that can be installed on any traditional hitch ball and thereafter can be used with any trailer, i.e., there is no special equipment that must be attached to the trailer.

Figure 4:
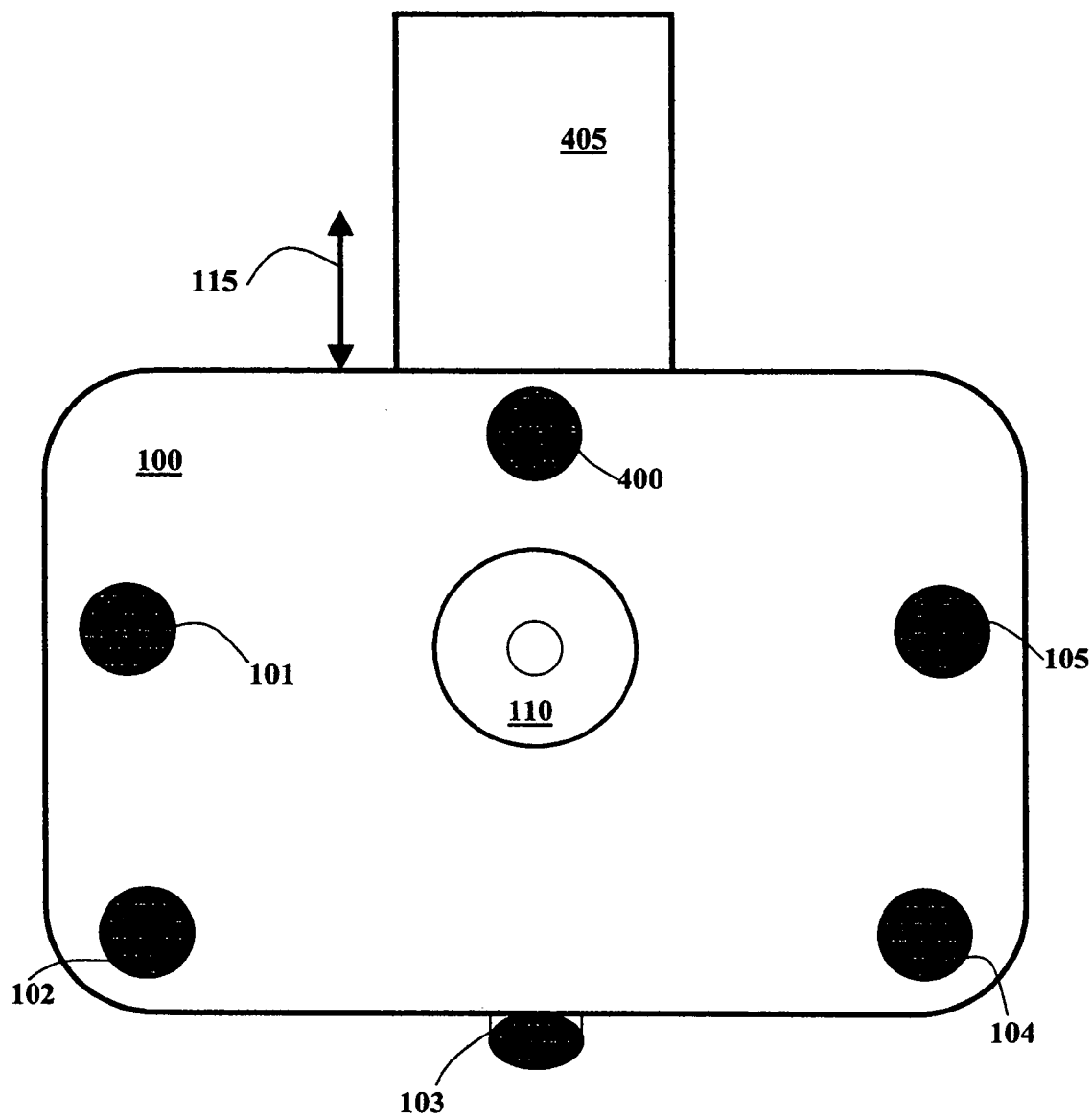
FIG. 4 is a top view of an alternative embodiment of the sensor plate.

FIG. 4 shows an alternative embodiment of the sensor plate 100, which can be used on vehicles with U-Haul hitches, Reece hitches and other equipment that extends the ball 110 further away from the rear of the vehicle than a traditional ball hitch attached to the bumper of the vehicle. In these extended hitches, the ball is permanently attached to a metal support bar that has a square cross-section. The metal bar is adapted to be inserted into a square socket that is permanently attached to the rear of the towing vehicle. In this embodiment, the sensor plate 100 includes seven sensors 101–105 and 400. The sixth sensor 400 is positioned between the ball 110 and the towing vehicle (not shown). The sixth sensor 400 can indicate to the driver that he has backed up the towing vehicle too close to the tongue, since tow bars extend the ball away from the vehicle a distance that allows this scenario to occur. The angled sensor 103 serves the same purpose as the angled sensor in the preferred embodiment, i.e., it detects the tongue first at approximately two feet away. Sensors 101 and 105 can work in conjunction with sensor 400 to allow the present guidance system to indicate whether the driver is too close left or too close right. Referring back to FIG. 2, a situation of too close left would be shown in the display box 200 by the illumination of arrows 205 and 215. These arrows would tell the driver to move the ball (rear of the vehicle) forward and to the right; until the large red light 250 in the middle of the display box 200 is illuminated. The sensor plate 100 is permanently attached to the support bar 405 in this embodiment.

Figure 5:
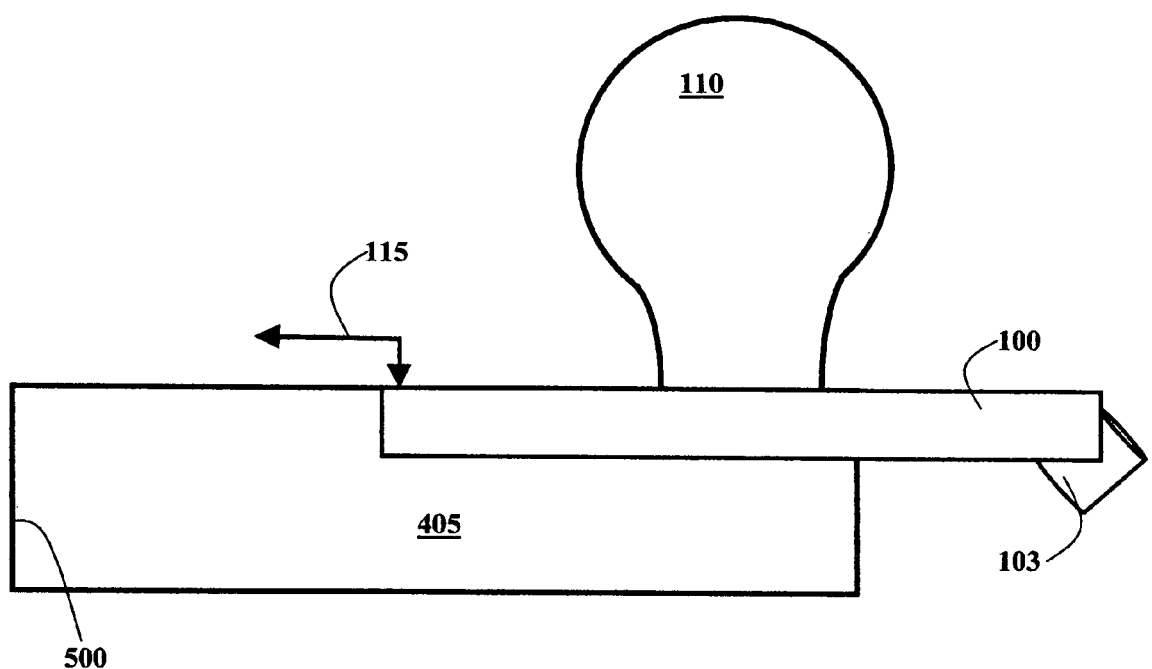
FIG. 5 is a side view of the embodiment shown in FIG. 4.

FIG. 5 is a side view of the embodiment shown in FIG. 4. Sensor plate 100 is permanently attached to the top of support bar 405. The sensor plate 100 can be welded to existing U-Haul and Reece's hitches or both parts could be produced as one piece. The support bar 405 is placed in its operation position by sliding the end 500 of the bar into a socket that is attached to the towing vehicle. Cable 115 carries detection signals to the display box and delivers electrical power to the sensors. Of course, if battery power is used and the detection signals are delivered wirelessly, the cable 115 will not be needed. Sensor 103 provides the same function as in the preferred embodiment. Sensor 103 is the first sensor to detects the trailer's tongue when it is approximately two feet from the ball and sends a signal to the display box.

Figure 6:
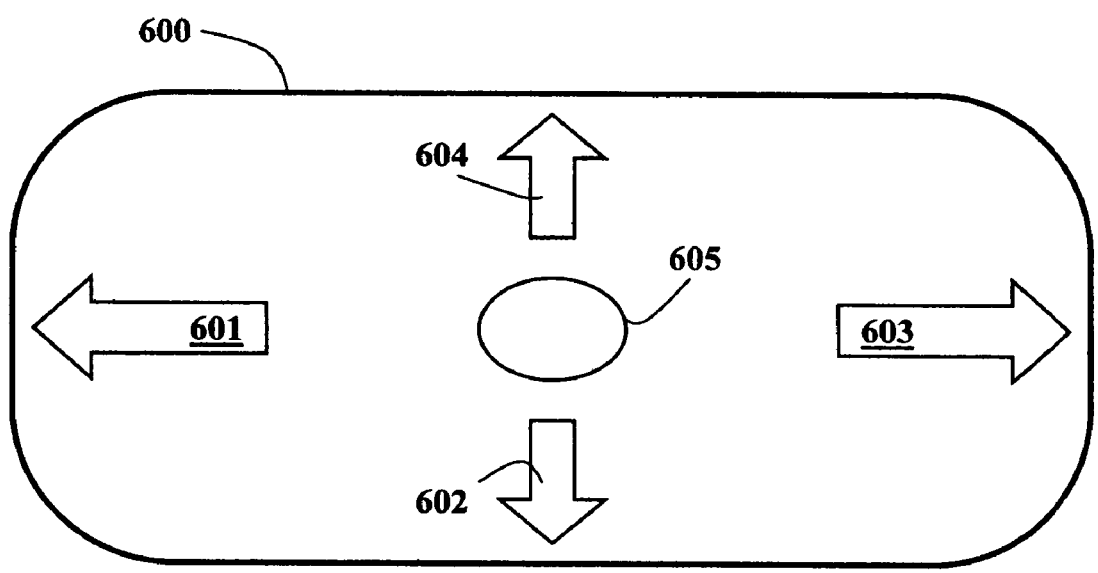
FIG. 6 is a frontal view an alternative embodiment of the display.

FIG. 6 shows an alternative embodiment of the display for present guidance system. In this embodiment, multiple lights 601–605 have been embedded in the rear view mirror 600 of the towing vehicle. Each light 601–605 is comprised of one or more light emitting diodes (LED's) in the preferred embodiment. The lights 601–605 can be used in multiple combination based on the detection signals received from the sensor plate. Preferably, arrow light 602 is initially illuminated when the sensor plate first "sees" the tongue of the trailer. The other arrow lights 601, 603 and 604 then light up as needed, instructing the driver to maneuver the ball in the indicated direction. When the ball is finally in the home position, the center light 605 is illuminated. In another embodiment, the display box is adapted to attach to the vehicle's rear view mirror. The present two piece invention will greatly aid the hitching of boat trailers to towing vehicles, however the invention will also help in the hitching of mobile homes, campers and other trailers to towing vehicles as well.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A guidance system adapted to be attached to a towing vehicle wherein the guidance system provides visual and auditory signals to a driver of the vehicle that aids the driver in hitching a trailer to a rear of the vehicle, wherein the vehicle has a ball type hitch attached to the rear of the vehicle and the trailer has a tongue type hitch attached to a front of the trailer, the guidance system comprising:

a sensor plate, the sensor plate having a shape of a semicircle, wherein a non-circular edge of the semicircle is designed to face toward the towing vehicle and, wherein a flat top surface of the semicircular sensor plate faces upward, the sensor plate also having a hole through a center portion of the plate, the hole being adapted for protrusion therethrough of a stem of the ball hitch, and plate being adapted to be secured to the rear of the towing vehicle by the stem, a bottom portion of the ball hitch and a nut capable of being screwed on to a bottom portion of the stem, wherein the sensor plate houses multiple sensors, the sensors being dispersed around a periphery of the sensor plate, wherein each sensor is capable of detecting when an object is above it, and wherein each sensor is electrically connected to a sensor plate cable that provides power to the sensors and receives detection signals from the sensors; and, a display box, the display box having multiple lights and a speaker, the multiple lights including at least four lights for indicating that the driver should move forward, backwards, left and right, respectively, wherein the display box is adapted to be electrically connected to a power source in the vehicle, and the display box is electrically connected to the sensor plate cable;

wherein, during a hitching procedure, when the tongue passes over any sensor the sensor sends a detection signal to the display box and wherein, the display box receives all detection signals and causes one or more of the lights to illuminate wherein the illuminated lights provide guidance to the driver for properly aligning the ball and the tongue.

2. The guidance system of claim 1, wherein the power source in the vehicle is a cigarette lighter or a fuse box.

3. The guidance system of claim 1, wherein the display box includes one or more batteries and the display box receives electrical power from the one or more batteries.

4. The guidance system of claim 1, wherein the multiple lights on the display box include a left arrow, a right arrow, a backwards arrow, and a forward arrow.

5. The guidance system of claim 1, wherein the multiple lights on the display box include a large central light that lights up when the ball is properly aligned with the tongue.

6. The guidance system of claim 1, wherein the speaker in the display box provides beeps when the tongue has been detected by any of the sensors and a solid tone when the ball is properly aligned for hitching with the tongue.

7. The guidance system of claim 1, wherein the sensor plate houses 5 or more sensors.

8. The guidance system of claim 1, wherein the sensors are photoelectric sensors.

9. The guidance system of claim 1, wherein the sensor plate cable includes a quick disconnect coupler that allows the sensor plate to easily be electrically disconnected from, and re-connected to, the display box.

10. The guidance system of claim 1, wherein the sensor plate includes a radio transmitter and at least one battery that provides power to the sensors and the transmitter, the display box includes a radio receiver and wherein the sensor plate cable is replaced by a wireless connection between the sensor plate and the display box.

11. The guidance system of claim 1, wherein the display box includes mounting equipment that allows the display box to be at least temporarily mounted in the interior of the vehicle, including on a rearview mirror of the vehicle.

12. The guidance system of claim 1, wherein the sensor plate is either circular or rectangular in shape, and wherein the display box includes a remote display screen with multiple lights and the remote display screen is a rearview mirror.

13. The guidance system of claim 1, wherein the speaker of the display box provides verbal directions to the driver, including "back up slowly", "go right", "go left" and "stop".

14. The guidance system of claim 1, wherein the sensor plate includes a first detection sensor that is angled towards the trailer so that the first detection sensor is able to detect the tongue of the trailer when the tongue is approximately two feet from the ball.

* * * * *